US012214744B1

United States Patent
Park

(10) Patent No.: US 12,214,744 B1
(45) Date of Patent: Feb. 4, 2025

(54) LINK LOCKING DEVICE OF SEAT FOR VEHICLE

(71) Applicant: DAS CO., LTD, Gyeongju-si (KR)

(72) Inventor: Sang Ok Park, Yongin-si (KR)

(73) Assignee: DAS CO., LTD, Gyeongju-si (KR)

( * ) Notice: Subject to any disclaimer, the term of this patent is extended or adjusted under 35 U.S.C. 154(b) by 0 days.

(21) Appl. No.: 18/396,129

(22) Filed: Dec. 26, 2023

(30) Foreign Application Priority Data

Nov. 8, 2023 (KR) .......................... 10-2023-0153754

(51) Int. Cl.
*B60R 22/20* (2006.01)
*B60N 2/68* (2006.01)
*B60R 22/18* (2006.01)

(52) U.S. Cl.
CPC ............ *B60R 22/202* (2013.01); *B60N 2/688* (2013.01); *B60N 2205/20* (2013.01); *B60R 2022/1812* (2013.01); *B60R 2022/1818* (2013.01)

(58) Field of Classification Search
CPC .......... B60R 22/202; B60R 2022/1812; B60R 2022/1818; B60N 2/688; B60N 2205/20
See application file for complete search history.

(56) References Cited

U.S. PATENT DOCUMENTS

| 2019/0039484 A1* | 2/2019 | Frye ...................... B60N 2/2213 |
| 2021/0001757 A1* | 1/2021 | Toda ........................ B60N 2/688 |

FOREIGN PATENT DOCUMENTS

| CN | 105531146 A | * | 4/2016 | ......... B60N 2/01583 |
| CN | 111670133 A | * | 9/2020 | ......... B60N 2/01541 |
| DE | 102007023074 A1 | * | 11/2008 | ............. B60N 2/688 |
| DE | 102008007856 A1 | * | 10/2009 | ............. B60N 2/688 |
| EP | 3922512 A1 | * | 12/2021 | ............... B60N 2/20 |
| WO | WO-2022191383 A1 | * | 9/2022 | ............. B60R 22/12 |

\* cited by examiner

*Primary Examiner* — Drew J Brown
(74) *Attorney, Agent, or Firm* — Tarolli, Sundheim, Covell & Tummino LLP

(57) ABSTRACT

A link locking device of a vehicle seat is configured to prevent a force exerted on a seat belt from causing the rotation of a height link through a buckle. The device includes a sector gear unit rotatably fastened to a cushion frame and fastened to a link connection unit, to which a height link provided in a seat rail is rotatably coupled, to rotate together and a locking unit rotatably coupled to the cushion frame and fastened to a buckle of a seat belt to engage the sector gear unit and block the rotation of the link connection unit when the buckle is pulled. In this configuration, when the buckle is pulled, the locking unit engages the sector gear unit to restrain the link connection unit from rotating to prevent the rotation of the height link, thereby having the effect of preventing the distortion of the seat cushion.

7 Claims, 6 Drawing Sheets

LINK LOCKING DEVICE OF SEAT FOR VEHICLE

CROSS-REFERENCE TO RELATED APPLICATION

The present application claims priority to Korean Patent Application No. 10-2023-0153754, filed Nov. 8, 2023, the entire contents of which is incorporated herein for all purposes by this reference.

BACKGROUND OF THE INVENTION

Field of the Invention

The present invention relates to a link locking device of a vehicle seat, and more particularly to a link locking device of a vehicle seat configured to prevent the force exerted on a seat belt from causing a height link to rotate through a buckle.

Description of the Related Art

In general, vehicle seats are equipped with various convenience features for the comfort of passengers.

The convenience features include a sliding function that allows forward and backward adjustment of a seat cushion according to the passenger's body shape, a reclining function that allows tilt adjustment of a seatback corresponding to the backrest, and a seat height adjustment function that allows height adjustment of the seat cushion to fit the passenger's body size.

In addition, the seats are equipped with seat belts for passenger safety, and a buckle for fastening the seat belt is affixed to the upper rail at the top by a separate connecting member and connecting bracket on one side of the seat.

In such a conventional structure, it is possible to support the seat belt even under strong collision loads as long as the separation strength between the upper rail and the lower rail affixed to the vehicle body was sufficient. However, since the buckle for affixing the seat belt is mounted on the rail affixed to the vehicle body, the buckle protrudes excessively when the cushion is adjusted to the lowest position while the buckle is concealed under the cushion when the cushion is adjusted to the highest position.

To address this issue, the buckle was mounted on the seat base rather than the upper rail as in the conventional design so that the buckle could remain in the same position when the base moves according to the height adjustment.

However, when a vehicle equipped with a buckle affixed to the seat base through a connecting bracket is involved in a collision, the force propelling the passenger forward is exerted on the seat belt, the force exerted on the seat belt is transmitted to the buckle, a strong rotational force is transmitted to the height link as the side frame coupled to the buckle is lifted by the force pulling the buckle, and consequently, the buckle side link without a rotation prevention device of the link rotates under the intense load to distort the seat cushion. As a result, the support member in the cushion is damaged, and the support necessary for preventing forward movement and sagging of the cushion is compromised.

Therefore, there is a need to develop a device that restrains the rotation of the link to prevent the impact load of the buckle from causing the buckle side height link to rotate when a strong impact load is applied due to a collision.

DOCUMENT OF RELATED ART (Patent Document) Japanese Laid-open Patent Application 2011-037407 (Feb. 24, 2011)

SUMMARY OF THE INVENTION

The present invention is designed to address the issue described above, and an object of the present invention is to provide a link locking device of a vehicle seat configured to prevent the force exerted on a seat belt from causing a height link to rotate through a buckle.

To achieve the object described above, a link locking device of a vehicle seat according to a preferred embodiment of the present invention includes a sector gear unit rotatably fastened to a cushion frame and fastened to a link connection unit, to which a height link provided in a seat rail is rotatably coupled, to rotate together and a locking unit rotatably coupled to the cushion frame and fastened to a buckle of a seat belt to engage the sector gear unit and block the rotation of the link connection unit when the buckle is pulled.

Here, the sector gear unit may include a sector gear unit main body fastened to the link connection unit between the cushion frame and the height link and a sector gear formed from the sector gear unit main body toward the locking unit.

The locking unit may include a base frame fastened to the cushion frame, a rotating member rotatably fastened to the base frame and having a pawl gear to engage the sector gear unit, a guide link rotatably fastened to the base frame and having one side fastened to the buckle to receive the rotational power, and a power transmission unit rotatably positioned on the base frame and having one end fastened to the rotating member and the other end fastened to the guide link to transmit the rotational power of the guide link to the rotating member.

Here, the power transmission unit may include a power transmission unit body bent into a streamlined shape and positioned in tight contact with the guide unit provided concentrically with the rotation axis of the rotating member, a first support portion bent toward the rotation axis at one end of the power transmission unit body to catch on and be supported by a catch groove formed in the guide link, and a second support portion bent toward the sector gear unit at the other end of the power transmission unit body to catch on and be supported by a catch boss formed in the rotating member.

The locking unit may include a buckle shaft positioned through slot holes formed in the base frame and the cushion frame and having one end fastened to the buckle and the other end rotatably fastened to one side of the guide link.

In addition, the locking unit may include an elastic member having one end fastened to the buckle shaft and the other end fasted to the base frame to apply an elastic force to cause the guide link rotated by the buckle to return to its original position.

The base frame may include a rotating member hinge portion to which the rotating member is rotatably fastened and which has an end to which the other end of the elastic member is fastened, and a guide link hinge portion to which the guide link is rotatably fastened.

DETAILED DESCRIPTION OF THE INVENTION

Preferred embodiments of the present invention will be described in detail with reference to the accompanying diagrams.

The present invention may be diversely modified and may have various embodiments. Certain embodiments will be illustrated in drawings and specifically described in the detailed description below. It is to be understood that the specific embodiments are not intended to limit the present invention thereto and that all modifications, equivalents, or substitutes within the spirit and technical scope of the present invention are included.

The terms used in the present application are used to describe the specific embodiments only and are not intended to limit the present invention. Singular expressions may include plural expressions unless the context expressly means otherwise.

Unless otherwise defined, all terms used herein, including technological or scientific terms, may have the same meaning as the terms commonly understood by those skilled in the art to which the present invention pertains. Terms defined in commonly used dictionaries may be interpreted as having meanings consistent with the contextual meanings of the related technology and may not be interpreted in an idealistic or overly formal sense unless expressly defined in the present specification.

Figure 1:
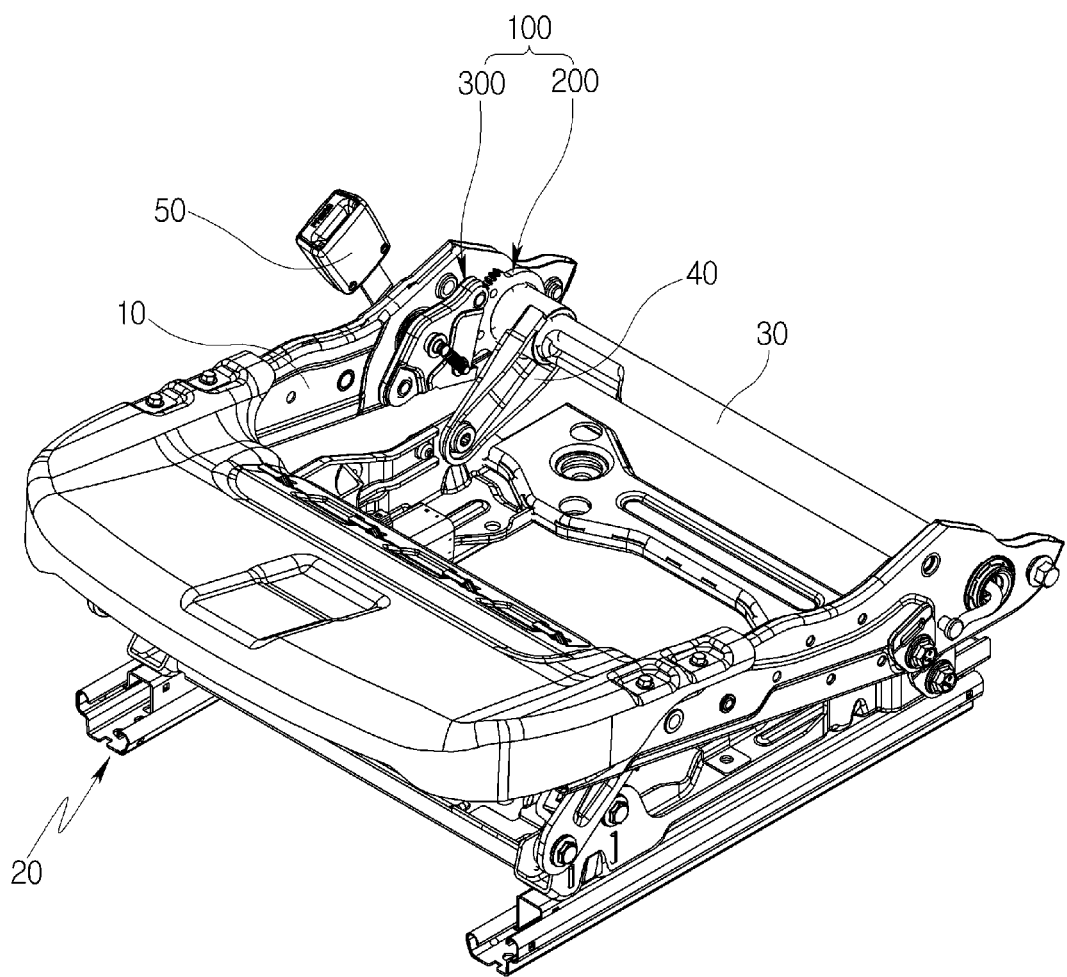
FIG. 1 is a perspective view schematically illustrating a link locking device of a vehicle seat installed in a seat according to an embodiment of the present invention.
Figure 2:
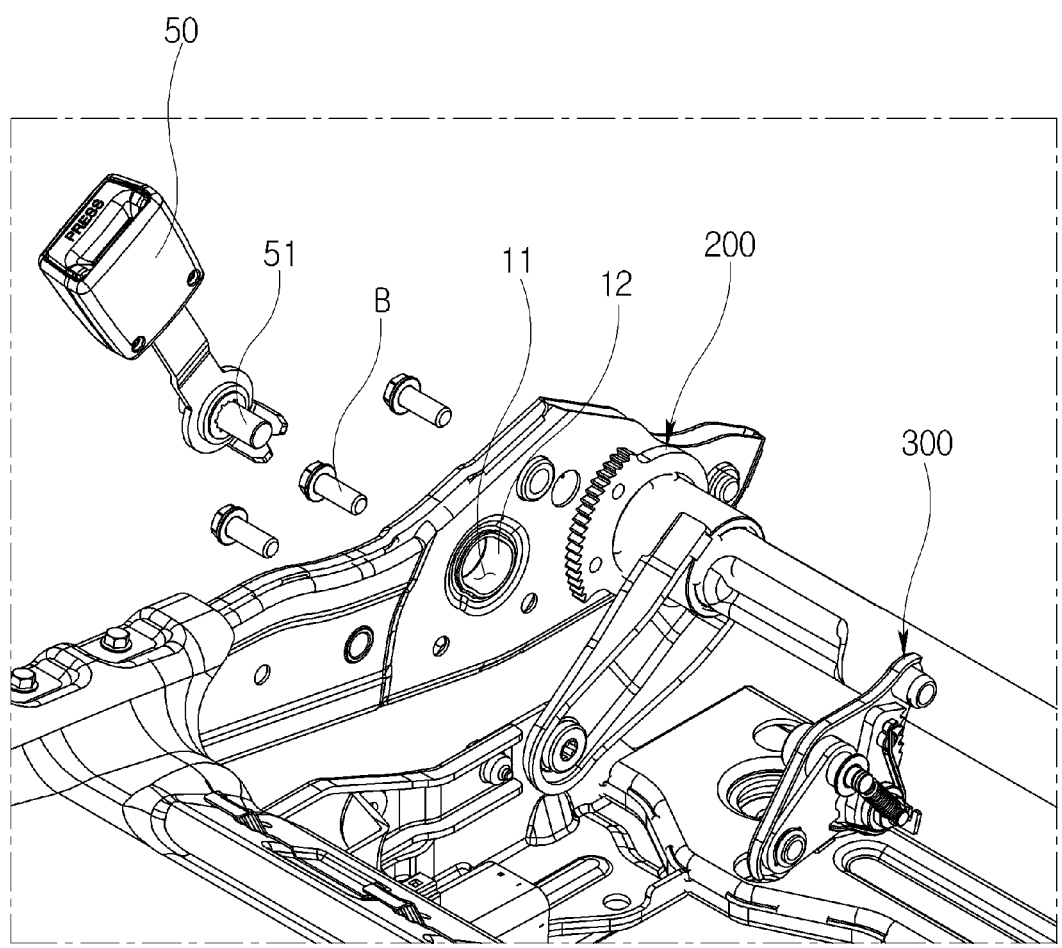
FIG. 2 is an exploded perspective view schematically illustrating a link locking device of a vehicle seat detached from a seat according to an embodiment of the present invention.
Figure 3:
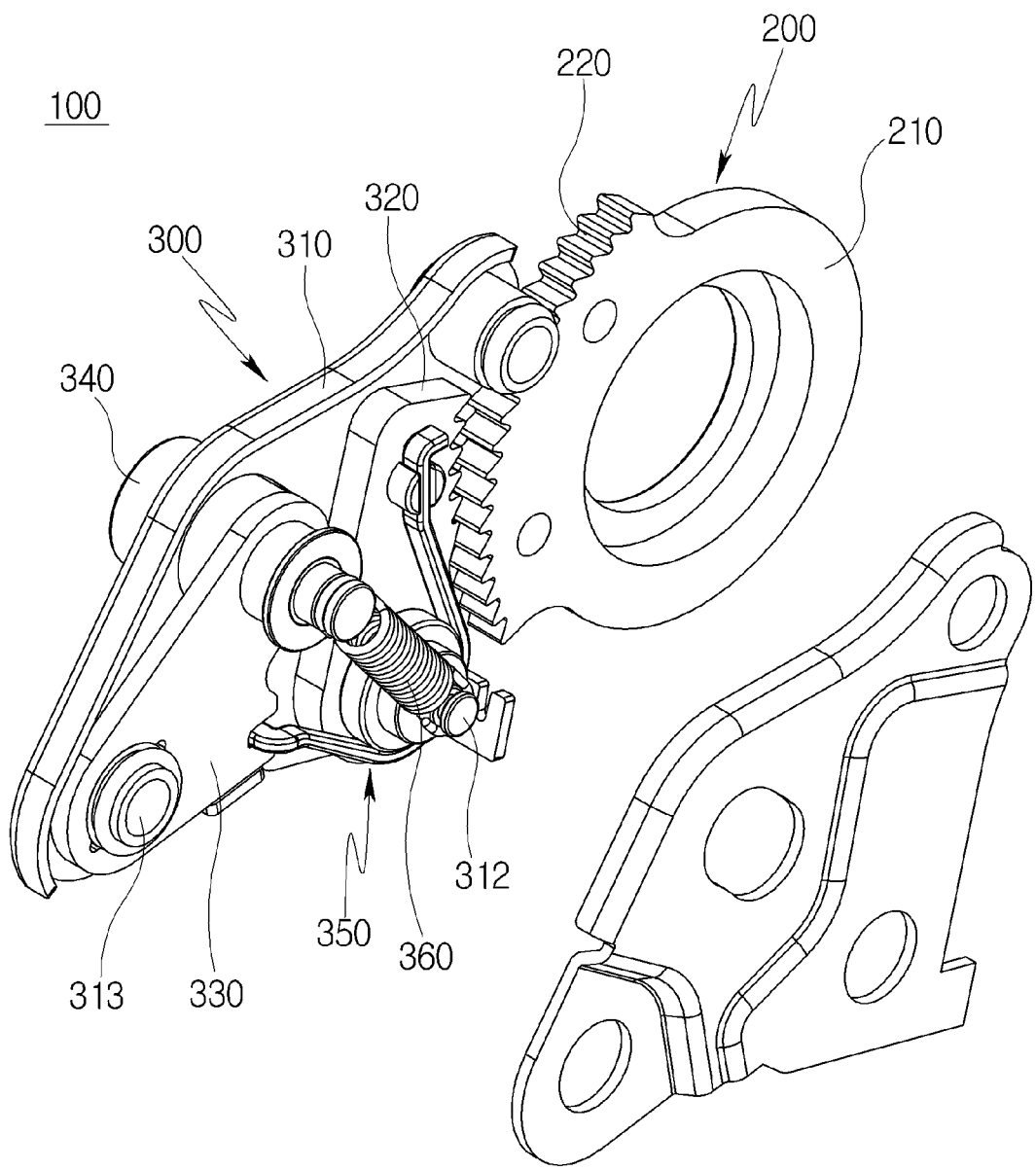
FIG. 3 is a perspective view schematically illustrating a link locking device of a vehicle seat according to an embodiment of the present invention.
Figure 4:
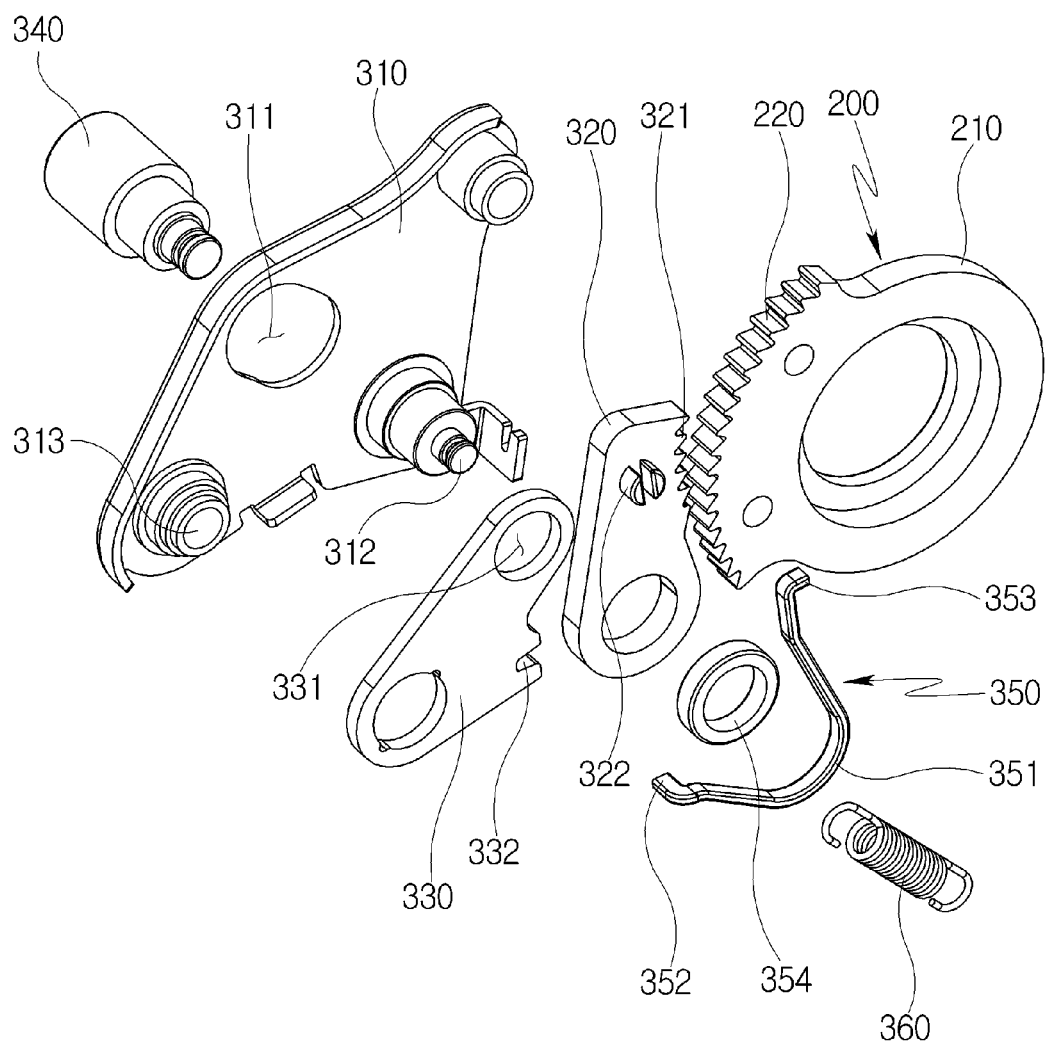
FIG. 4 is an exploded perspective view schematically illustrating a link locking device of a vehicle seat according to an embodiment of the present invention.
Figure 5:
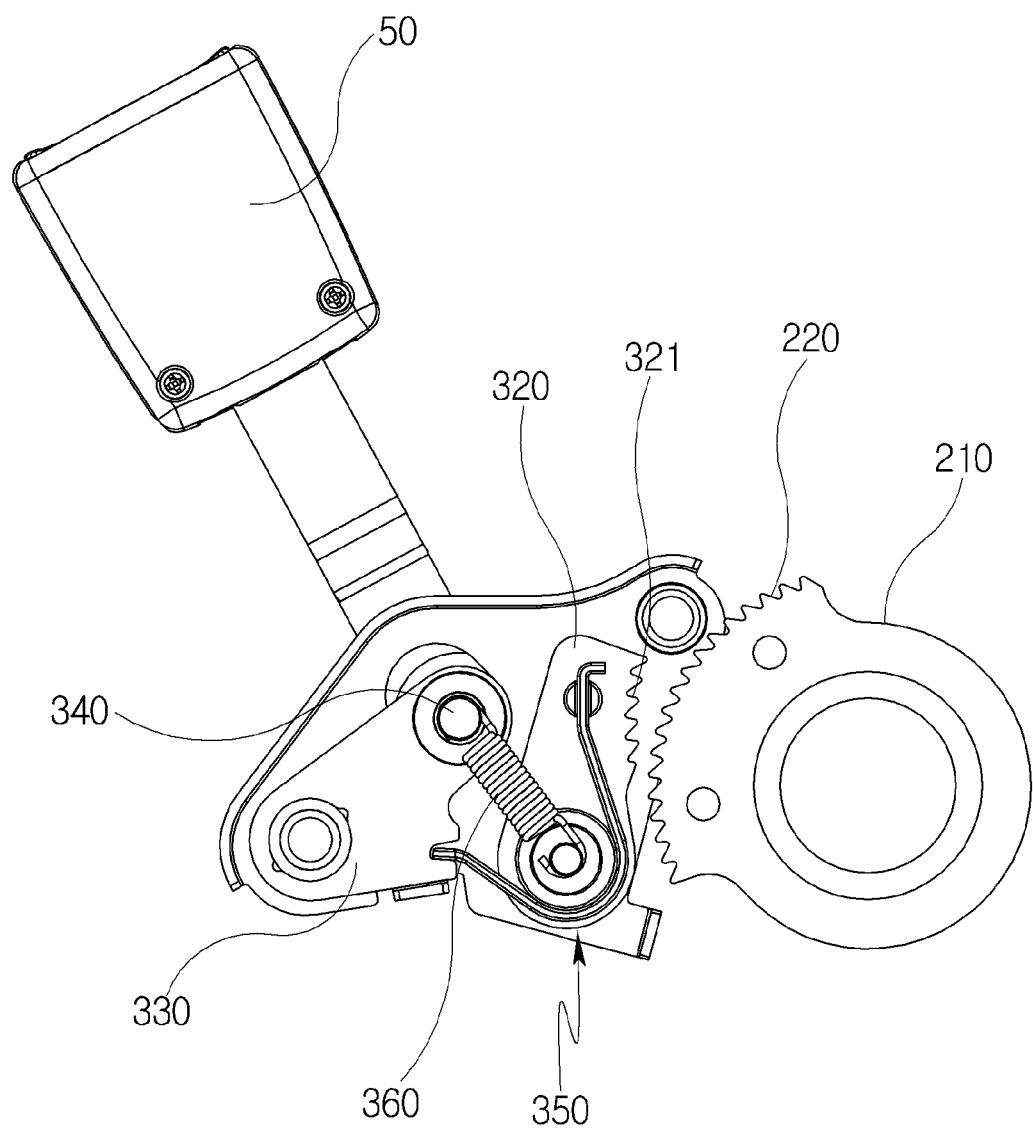
FIG. 5 is a view schematically illustrating a link locking device of a vehicle seat before a buckle is pulled according to an embodiment of the present invention.
Figure 6:
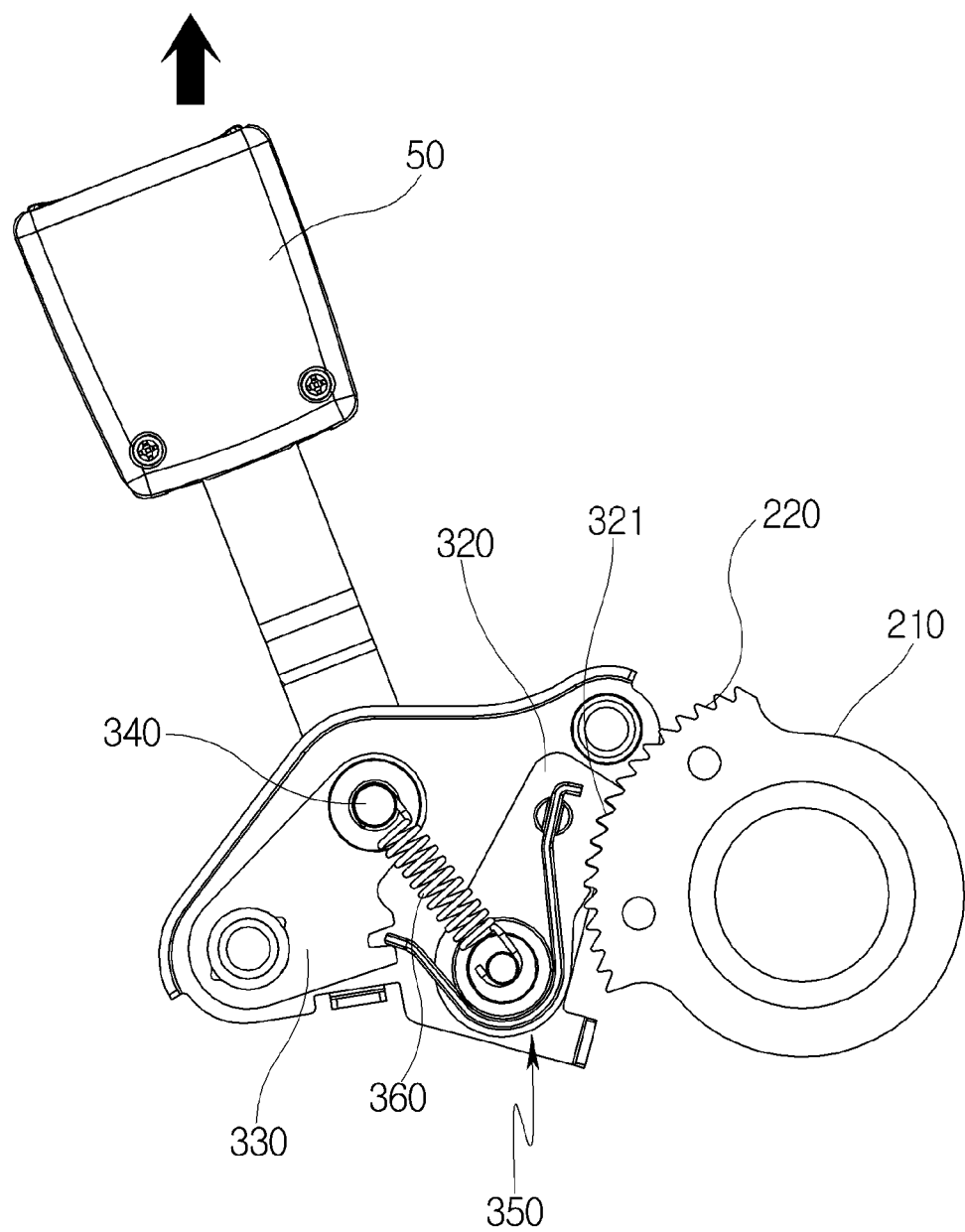
FIG. 6 is a view schematically illustrating a link locking device of a vehicle seat when a buckle is pulled according to an embodiment of the present invention.

Hereinafter, specific embodiments of the present invention will be described in detail with reference to the accompanying drawings FIGS. 1 and 2 are a perspective view and an exploded perspective view schematically illustrating a link locking device of a vehicle seat installed in a seat according to an embodiment of the present invention; FIGS. 3 and 4 are a perspective view and an exploded perspective view schematically illustrating the link locking device of a vehicle seat; FIGS. 5 and 6 are views schematically illustrating the link locking device for a vehicle before and after a buckle is pulled.

FIGS. 1 to 6 show that a link locking device 100 for a vehicle seat according to an embodiment of the present invention includes a sector gear unit 200 rotatably fastened to a cushion frame 10 and fastened to a link connection unit 30, to which a height link 40 provided in a seat rail 20 is rotatably coupled, to rotate together and a locking unit 300 rotatably coupled to the cushion frame 10 and fastened to a buckle 50 of a seat belt to engage the sector gear unit 200 and block the rotation of the link connection unit 30 when the buckle is pulled.

The seat rail 20 is installed on the floor panel inside the vehicle and is equipped to be movable in the forward and backward directions of the vehicle. One side of the height link 40 is rotatably coupled to the rear end of the seat rail 20 while the other side of the height link 40 is rotatably coupled to the link connection unit 30 rotatably fastened to the cushion frame 10. In other words, the height of the cushion frame 10 can be adjusted upward and downward with respect to the seat rail 20, and the link connection unit 30 and the height link 40 rotate when the cushion frame 10 moves.

Therefore, when at least either of the link connection unit 30 and the height link 40 is restrained from rotating, the movement of the cushion frame 10 is restrained and the distortion of the seat cushion may be prevented.

Accordingly, in the present invention, when the buckle 50 is pulled due to a collision, the locking unit 300 engages the sector gear unit 200 to restrain the link connection unit 30 from rotating so that the movement of the cushion frame 10 may be restrained.

To this end, the sector gear unit 200 is fastened to the link connection unit 30 rotatably fastened to the cushion frame 10 and engages the locking unit 300 to restrain the rotation when the buckle 50 is pulled.

More specifically, the sector gear unit 200 includes a sector gear unit main body 210 fastened to the link connection unit 30 between the cushion frame 10 and the height link 40 and a sector gear 220 formed from the sector gear unit main body 210 toward the locking unit 300. Here, the sector gear 220 includes a plurality of sector gear teeths.

The locking unit 300 is rotatably coupled to the cushion frame 10, is fastened to the buckle 50 of the seat belt, and engages the sector gear 220 of the sector gear unit 200 to block the rotation of the link connection unit 30 when the buckle is pulled.

More specifically, the locking unit 300 includes a base frame 310 fastened to the cushion frame 10, a rotating member 320 rotatably fastened to the base frame 310 and having a pawl gear 321 to engage the sector gear unit 200, a guide link 330 rotatably fastened to the base frame 310 and having one side fastened to the buckle 50 to receive rotational power, and a power transmission unit 350 rotatably positioned on the base frame 310 and having one end fastened to the rotating member 320 and the other end fastened to the guide link 330 to transmit the rotational power of the guide link 330 to the rotating member 320.

The locking unit 300 also includes a buckle shaft 340 positioned through the slot holes 11, 311 formed in the base frame 310 and the cushion frame 10 and having one end fastened to the buckle 50 and the other end rotatably fastened to one side of the guide link 330.

In this configuration, the buckle 50 is positioned on the outside of the cushion frame 10 and the buckle fastening member 51 is fastened to one end of the buckle shaft 340 positioned through both the slot hole 11 formed in the cushion frame 10 and the slot hole 311 formed in the base frame 310 to fasten the buckle 50 to the buckle shaft 340.

This allows the buckle shaft 340 to move upward along the slot holes 11, 311 when the buckle 50 is pulled upward.

Here, the cushion frame 10 may include a guide bushing 12 for guiding the movement of the buckle shaft 340 positioned around the periphery of the slot hole 11. The guide bushing 12 may guide the movement of the buckle shaft 340 and prevent noise caused by the collision between the buckle shaft 340 and the cushion frame 10.

The base frame 310 is fastened to the cushion frame 10 and the slot hole 311 is formed for the buckle shaft 340 to be movably inserted thereinto.

The base frame 310 includes a rotating member hinge portion 312 to which the rotating member 320 is rotatably fastened and a guide link hinge portion 313 to which the guide link 330 is rotatably fastened.

The base frame 310 is fastened to the cushion frame 10 through a fastening member B, which is a bolt. At this time, a plurality of fastening members is screwed to the rotating member hinge portion 312 and the guide link hinge portion 313 respectively through the cushion frame 10 from the outside of the cushion frame 10 while the base frame 310 is positioned on the inside of the cushion frame 10 to fasten the base frame 310 to the cushion frame 10.

The guide link 330 is inserted and rotatably fastened onto the guide link hinge portion 313 provided in the base frame 310. A buckle shaft 340 is inserted and fastened into a buckle shaft fastening hole 331 formed on one side of the guide link while a catch groove 332 is formed on the other side to catch and support a first support portion 352 of the power transmission unit 350.

The rotating member 320 is inserted and rotatably fastened onto a rotating member hinge portion 312 provided in the base frame 310, includes a pawl gear 321 on a surface facing the sector gear unit 200, and includes a catch boss 322 protruding parallel to the rotation axis from the rear of the pawl gear 321 to catch and support a second support portion 353 of the power transmission unit 350 to receive the rotational power.

The power transmission unit 350 is rotatably positioned on the base frame 310 and has one end fastened to the rotating member 320 and the other end fastened to the guide link 330 to transmit the rotational power of the guide link 330 to the rotating member 320.

In other words, the rotating member 320 and the guide link 330 are spaced apart from each other and are connected by the power transmission unit 350 so that when the guide link 330 is rotated by the buckle 50, the power transmission unit 350 transmits the rotational power to the rotating member 320 to rotate the rotating member 320. The power transmission unit 350 may be made of an elastic material to absorb the shock that may occur while transmitting the rotational power and thus allow elastic deformation.

More specifically, the power transmission unit 350 may include a power transmission unit body 351 bent into a streamlined shape and positioned in tight contact with the guide unit 354 fitted onto the rotating member hinge portion 312 provided concentrically with the rotation axis of the rotating member 320, a first support portion 352 bent toward the rotation axis at one end of the power transmission unit body 351 to catch on and be supported by a catch groove 332 formed in the guide link 330, and a second support portion 353 bent toward the sector gear unit 200 at the other end of the power transmission unit body 351 to catch on and be supported by a catch boss formed in the rotating member 320.

In this configuration, as illustrated in FIG. 6, when the buckle 50 is pulled, the buckle shaft 340 moves upward to move one side of the guide link 330 upward and rotate the guide link 330 around the guide link hinge portion 313. As a result, the catch groove 332 moves upward to activate the power transmission unit 350 and the power transmission unit 350 rotates the rotating member 320 toward the sector gear unit 200 so that the pawl gear 321 engages the sector gear 220. The locking unit 300 further includes an elastic member 360 having one end fastened to the buckle shaft 340 and the other end fastened to an end of the rotating member hinge portion 312 provided in the base frame 310 to apply an elastic force to cause the guide link 330 rotated by the buckle 50 to return to its original position.

In this configuration, as illustrated in FIG. 6, when the buckle 50 is pulled, the rotating member 320 rotates to engage the pawl gear 321 with the sector gear 220 so that the elastic member 360 is stretched to generate an elastic force.

When the force pulling the buckle 50 is removed, the elastic force of the elastic member 360 causes the guide link 330 to return to its original position and the power transmission unit 350 also returns to its original position so that the pawl gear 321 is detached from the sector gear 220 to return to its original position as illustrated in FIG. 5.

According to the link locking device of a vehicle seat of the present invention, when the buckle is pulled, the locking unit engages the sector gear unit to restrain the link connection unit from rotating and prevent the rotation of the height link, thereby having the effect of preventing the distortion of the seat cushion.

The present invention is described in detail through specific embodiments above. However, this is intended to serve the purpose of specifically describing the present invention, and it is evident that the present invention is not limited thereto and may be modified and improved upon by those skilled in the art within the technical spirit of the present invention.

All simple modifications and changes of the present invention fall within the scope of the present invention, and the specific scope of protection of the present invention will be made clear by the appended patent claims.

DESCRIPTION OF REFERENCE NUMERALS

10: cushion frame
12: guide bushing
20: seat rail
30: link connection unit
40: height link
50: buckle
100: link locking device for vehicle seat
200: sector gear unit
210: sector gear unit main body
220: sector gear
300: locking unit
310: base frame
312: rotating member hinge portion
313: guide link hinge portion
320: rotating member
321: pawl gear
322: catch boss
330: guide link
331: buckle shaft fastening hole
332: catch groove
340: buckle shaft
350: power transmission unit
351: power transmission unit body
352: first support portion
353: second support portion
354: guide unit
360: elastic member

What is claimed is:

1. A link locking device of a vehicle seat, comprising:
a sector gear unit rotatably fastened to a cushion frame and fastened to a link connection unit, to which a height link provided in a seat rail is rotatably coupled, to rotate together; and
a locking unit rotatably coupled to the cushion frame and fastened to a buckle of a seat belt to engage the sector gear unit and block the rotation of the link connection unit when the buckle is pulled.

2. The device of claim 1, wherein the sector gear unit includes
- a sector gear unit main body fastened to the link connection unit between the cushion frame and the height link; and
- a sector gear formed from the sector gear unit main body toward the locking unit.

3. The device of claim 1, wherein the locking unit includes
- a base frame fastened to the cushion frame;
- a rotating member rotatably fastened to the base frame and including a pawl gear to engage the sector gear unit;
- a guide link rotatably fastened to the base frame and having one side fastened to the buckle to receive rotational power; and
- a power transmission unit rotatably positioned on the base frame and having one end rotatably fastened to the rotating member and the other end fastened to the guide link to transmit the rotational power of the guide link to the rotating member.

4. The device of claim 3, wherein the power transmission unit includes
- a power transmission unit body bent into a streamlined shape and positioned in tight contact with a guide unit provided concentrically with a rotation axis of the rotating member;
- a first support portion bent toward the rotation axis at one end of the power transmission unit body to catch on a catch groove formed in the guide link; and
- a second support portion bent toward the sector gear unit at the other end of the power transmission unit body to catch on and be supported by a catch boss formed in the rotating member.

5. The device of claim 3, wherein the locking unit includes a buckle shaft positioned through slot holes formed in the base frame and the cushion frame and having one end fastened to the buckle and the other end rotatably fastened to one side of the guide link.

6. The device of claim 5, wherein the locking unit includes an elastic member having one end fastened to the buckle shaft and the other end fastened to the base frame to apply an elastic force to cause the guide link rotated by the buckle to return to its original position.

7. The device of claim 6, wherein the base frame includes
- a rotating member hinge portion to which the rotating member is rotatably fastened and which has an end fastened to the other end of the elastic member; and
- a guide link hinge portion to which the guide link is rotatably fastened.

* * * * *